United States Patent Office 3,333,553
Patented Aug. 1, 1967

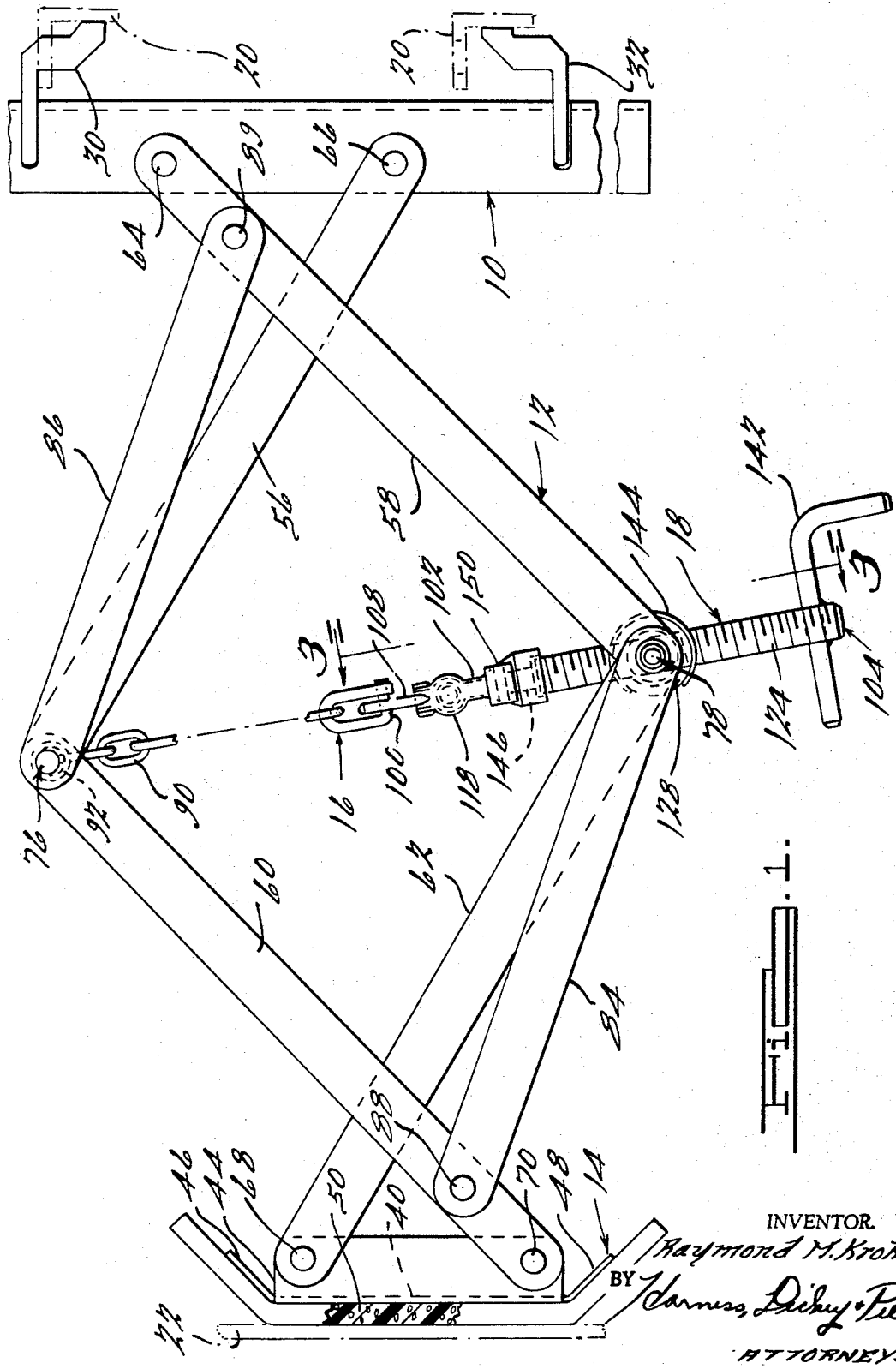

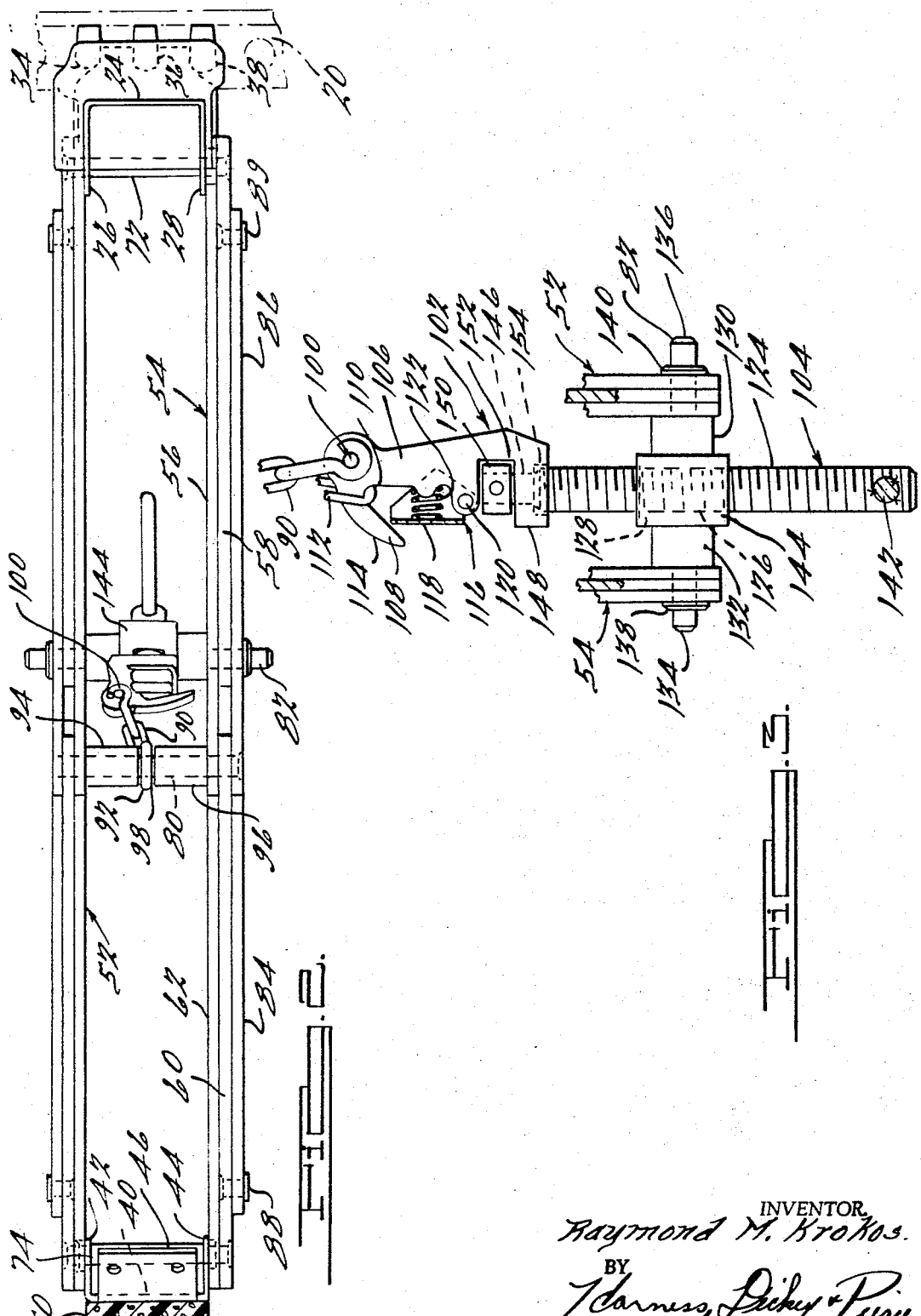

3,333,553
CARGO BRACING DEVICE
Raymond M. Krokos, Detroit, Mich., assignor to Evans Products Company, Plymouth, Mich., a corporation of Delaware
Filed Nov. 3, 1964, Ser. No. 408,472
16 Claims. (Cl. 105—369)

This invention relates to material handling equipment and more particularly to a cargo bracing device for use in railroad box cars or the like to brace cargo contained therein in spaced relationship to the box car walls.

This invention has particular utility in the bracing of sheet metal automobile bottom panels or the like in a railroad box car. In general, the device is adapted to be mounted on the side walls of the railroad box car for extension and retraction relative thereto. One end of the brace is provided with abutment means adapted to engage the sheet metal panels. The abutment means is mounted on extendable linkage means and a locking means is associated with the linkage means to maintain it in any one of a plurality of extended positions. Lockable adjusting means are provided for controlling extension of the abutment into engagement with the panels and for locking the abutment in an extended position.

It is the primary object of the present invention to provide new and improved cargo bracing means.

It is a further object of the present invention to provide new and improved cargo bracing means which is easily operable and adjustable, and which is also rugged, durable, and reliable in use.

It is a particular object of the present invention to provide a cargo bracing device including extendable linkage means having a locking mechanism associated therewith which is easily operated with manipulation of a mininum number of parts.

Other objects and many of the advantages of the present invention will be understood by those skilled in the art to which this invention relates by reference to the following detailed description of an illustrative embodiment of the invention and the accompanying drawings in which:

FIGURE 1 is a side elevational view of an illustrative embodiment of cargo bracing means employing the inventive concepts and principles;

FIG. 2 is a plan view of the apparatus shown in FIG. 1; and

FIG. 3 is an enlarged cross-sectional view of a portion of the apparatus shown in FIG. 1 taken along the line 3—3.

Referring now to FIG. 1, the cargo bracing apparatus is shown to comprise mounting bracket means 10, extensible and retractable linkage means 12, an abutment means 14, locking means 16, and adjusting means 18 for the locking means. The bracket means 10 is adapted to be mounted on a belt rail 20 or the like on the side wall of a railroad box car or the like as illustrated in FIG. 1. Abutment means 14 is adapted to abuttingly engage, brace, and hold cargo such as sheet metal panels 22 in spaced relationship to the side wall of the box car.

The bracket means 10 may be seen to comprise an elongated vertically extending channel member having a web portion 24 and spaced transversely extending flange portions 26, 28 as shown in FIG. 2. Mounting means 30, 32 are suitably secured to the channel member and include outwardly extending finger members 34, 36, 38, as seen in FIG. 2, which are adapted to engage the suitable apertured belt rail 20 on the box car wall. The fittings 30, 32 extend inwardly toward one another and, consequently, the bracket means may be mounted in either of two reversely situated positions. In either of these positions the cargo bracing apparatus receives its vertical support from only the upper one of the mounting means 30, 32.

The abutment means 14 comprises an elongated channel member having a web portion 40 and spaced transversely extending flange portions 42, 44, shown in FIG. 2. End portions 46, 48 may be bent rearwardly as shown in FIG. 1. A foam plastic cushion 50 may be mounted on the front of the abutment means to prevent marring or scratching of the cargo surfaces where necessary or to prevent other damage to the cargo.

Referring now to FIG. 2, the extensible and retractable linkage means 12 comprises spaced sets 52, 54 of parallelly extending linkages which are pivoted at one end to bracket means 10, at the other end to the abutment means 14, and are centrally pivotally connected. Since each set of links 52, 54 are identical, only the set of links 54 is hereinafter described in detail. Referring now also to FIG. 1, each set of links comprises pairs of crossed links 56, 58 and 60, 62. Links 56, 58 are pivoted at 64, 66 to the flange portion 28 of the bracket means 10. The links 60, 62 are similarly pivoted at 68, 70 to flange portion 44 of the abutment means. The pivotal connection of the outermost links 58, 60 includes suitable spacing sleeve means 61 so that the crossed links are freely movable relative to one another. Each pivotal connection may be formed by means of transversely extending pin means 72, 74 as shown in FIG. 2.

The other ends of the links are pivotally connected at 76, 78 by means of pin elements 80, 82 as shown in FIG. 2. In addition, support links 84, 86 are also pivotally mounted at one end at 78 and at the other end on the links 58, 60 at 88, 89. The purpose of the links 84, 86 is to triangulate the other links so that the front and rear pivotal connections will remain substantially parallelly located in common vertical planes. It has been found that these support links material aid in preventing twisting of the brace in use. It will be readily appreciated by those skilled in the art to which this invention relates that cargo braces of this type will be subjected to extreme conditions of stress in use in a railroad box car.

The locking means 16 comprises a link chain element 90 which is connected at one end to a fastening ring 92 mounted on the pivot pin means 80 and centrally located between the sets of linkages by means of spacer sleeves 94, 96 which define a centrally located slot 98. Bottom portions of the sleeves 94, 96 adjacent the ring 92 may be relieved as necessary to accommodate the connection of the link chain to the ring. The other end of the link chain is connected to a portion of the locking and adjustment means at 100. The chain has a length sufficient to enable the linkage means to be variably positioned in any of a plurality of adjusted positions between a fully extended position whereat the pivots 76, 78 would be spaced closely adjacent one another and a fully retracted position whereat the pivots 76, 78 would have a maximum spacing and whereat the abutment means 14 would be spaced closest to the bracket means 10. Accordingly, the chain 90 is provided with sufficient length to accomplish such movements of the linkages resulting in considerable chain slack in many of the extended positions.

Referring now to FIG. 3, the locking means further includes a hook element 102 mounted on the adjustment portion 18. Hook element 102 is provided with a hook portion 108 at its outer end defining a chain link seat 110 on which one of the links 112 of the chain 90 is adapted to be received. The outer surface 114 of the hook portion is curved to facilitate insertion through the chain links. Spring biased latch means 116 extends across the opening to the link seat 110. A depressible latch member 118 is pivotally mounted at 120 on the hook element 102. Compression spring means 122 is mounted between the latch element 118 and the hook element 102 to bias the latch to a closed position whereat the link 112 is prevented from being disengaged until the latch 118 is manually depressed. It will be appreciated that the latch hook 108 can be associated with any one of the intermediate links of the chain by simply inserting the free end of the hook portion in the link and then pulling the chain upwardly to force the link on to the seat 110 by depression of the latch 118. This maneuver can be performed with ease when the linkage is in an extended position beyond the extended position actually desired in use.

The adjustment means 18 comprises a threaded rod 124 threadably mounted in a threaded aperture 126 extending through a cylindrical mounting block 128 which is integrally formed centrally of the pin means 82. Spaced cylindrical portions 130, 132 serve as spacing elements for the linkages 52, 54 which are pivotally mounted on pin portions 134, 136 by suitable fastening means 138, 140. Consequently, the threaded rod 124 and the mounting block 128 are pivotally movable relative to the linkages 52, 54. A handle portion 142 is mounted on the end of the threaded rod 124 to permit micrometer type adjustments. An arcuate spring element 144 is mounted circumjacent the support 128 and provided with apertures in which the threaded rod 124 is frictionally received. The spring element 144 is compressed when the threaded rod 124 is inserted through its apertures so that its tendency to straighten out provides frictional bearing against the threaded rod 124 to locate and hold the threaded rod in any adjusted position as shown in FIG. 1. The frictional engagement between the spring element 144 and the threaded rod 124 will preclude vibration induced rotation of the rod 124 during interfit so as to preclude a change in the adjusted position of the abutment means 14. The handle portion 142 gives sufficient leverage, however, so that the threaded rod 124 may be adjusted without otherwise releasing the spring element 144.

The other end of the threaded rod is connected to the hook element 102 by means of a cylindrical portion 146 of reduced diameter which extends through an aperture in a mounting flange 148 of the hook element. A retaining nut 150 is fixedly secured to the end of the reduced end portion 146 in a slot 152 in the hook element so that the hook element is freely rotatably mounted on the end of the threaded adjustment rod 124. The bottom portion 154 of the aperture may be counterbored to enable swiveling pivotal movement of the hook element relative to the threaded rod.

It will be readily apparent that when a particular link of the chain element 90 is mounted on the seat 110 of the hook element, the amount of movement of pivots 76, 78 away from one another to contract the linkage is fixedly controlled by the length of chain extending between the pin 80 and the seat 110. The abutment means 14 cannot be moved toward the side walls of the box car beyond a certain position determined by the length of chain being held. On the other hand, the linkage is extendable in the opposite direction toward engagement with the cargo. In use, movement of the abutment means 14 to its fully extended position, is of course prevented by the abutting engagement of the abutment means 14 with the load. The position of the chain relative to the latch may be varied as necessary by manipulation of the latch 118 and insertion or removal of various links of the chain. In practice it has been found that threaded rod 124 is primarily only used for final micrometer type adjustments to obtain exact positioning of the abutment means 14 relative to the load. This arrangement has the advantage that once the apparatus has been adjusted for a given type of load in a particular load arrangement by means of the threaded rod, it is seldom necessary to make any additional adjustments after an initial adjustment. If it is desired to collapse the brace, the abutment means may be further extended until sufficient slack is obtained to remove the hook from the chain. When the chain is removed, the linkage can, of course, be fully collapsed, moving the abutment means 14 to its fully retracted position.

Since the inventive principles and concepts hereinbefore disclosed are capable of being applied to various embodiments of cargo bracing devices in various ways, it is intended that the scope of the appended claims be construed to include such variations and modifications except insofar as limited by the prior art.

What is claimed is:

1. A brace for use in a railroad boxcar or the like to brace goods therein comprising bracket means for mounting said brace within the boxcar, abutment means adapted to abuttingly engage the goods, linkage means interconnecting said bracket means with said abutment means for supporting said abutment means for movement toward and away from said bracket means, fine adjustment means comprising a pair of relatively movable members, and means providing a detachable connection between one member of said fine adjustment means and a portion of said linkage means for actuating said linkage means and changing the position between said bracket means and said abutment means.

2. The invention as defined in claim 1 and wherein said means providing the detachable connection comprises a link chain element, one end of said link chain element being pivotally connected to said linkage means, and the other end of said link chain element being variably adjustably connected to said adjustment means through the detachable connection to its one member.

3. The invention as defined in claim 2 and having hook means freely rotatably mounted on and fixed to the one member of said adjustment means, and said hook means being shaped and configured to be received in the links of said link chain element.

4. The invention as defined in claim 3 and having spring biased latch means mounted on said hook means and being operable between open and closed positions, said latch means being operable to the open position against the spring bias by engagement of said hook means with one of the links of said link chain element and a pulling motion of the one of the links relative to the hook means, and said latch means being movable to the closed position by the spring bias after the one of the links is engaged with the hook means at the end of the pulling motion.

5. The invention as defined in claim 1 and wherein said linkage means comprises a scissors arrangement of spaced parallel axially extending links forming spaced parallelly extending link sets pivoted at one end to said bracket means and at the other end to said abutment means, a pair of centrally located transversely spaced pivots on said spaced parallel links, spaced pin means extending between said pivots on said spaced parallel links, said means providing said detachable connection providing a connection to one of said pin means, and the other member of said adjustment means being mounted on another of said pin means.

6. The invention as defined in claim 5 and wherein said scissors linkage comprises for each set of parallel links, a pair of relatively long crossed links pivotally mounted at one end on said abutment means and another pair of relatively long crossed links pivotally mounted at one end on said bracket means, the other ends of each pair of links being pivotally connected to form a linkage extendable by transverse movement of the pivotal connections at the other ends of each pair of links toward one another and retractable by transverse movement of the pivotal connections at the other ends of each pair of links away from one another.

7. The invention as defined in claim 6 and having an additional link connecting each of the pivotal connections at the other ends of each pair of links to opposite ones of the links of each pair of links at points intermediate the links.

8. The invention as defined in claim 7 and having centrally located pivot means on said linkage means, said other member of said adjustment means comprising cross pin means extending between said centrally located pivot means, a threaded aperture extending transversely through said cross pin means said one member of said adjustment means comprising, a threaded rod threadably adjustably mounted in said threaded aperture, said means providing a detachable connection being detachably connected to said rod and locking means to restrain said threaded rod in a plurality of adjusted positions.

9. The invention as defined in claim 8 and wherein said locking means comprises an arcuately shaped spring segment mounted about said cross pin means and overlying said threaded apertures for retaining frictional engagement with said threaded rod means.

10. The invention as defined in claim 9 and having handle means attached to said rod means for threaded adjustment thereof.

11. A brace for use in a railroad boxcar or the like to brace goods therein comprising bracket means for mounting said brace within the boxcar, abutment means adapted to abuttingly engage the goods, a parallelogram linkage system supporting said abutment means upon said brace for movement relative to said brace from an extended to a retracted position, fine adjustment means comprising a pair of relatively movable members, means connecting one of said members to a first portion of said parallelogram linkage means, and coarse adjustment means providing a coarse adjustable connection between the other member of said fine adjustment means and a second portion of said parallelogram linkage system.

12. A brace as set forth in claim 11 wherein the first member of the fine adjustment means comprises an internally threaded nut and the other member comprises a threaded rod threadingly engaged in said nut.

13. A brace as set forth in claim 12 wherein the nut is affixed to one of the pivotal connections of the parallelogram linkage system.

14. A brace as set forth in claim 12 wherein the coarse adjustment means comprises a flexible transmitter.

15. A brace as set forth in claim 14 wherein the nut is affixed to one of the pivotal connections of the parallelogram linkage system.

16. A brace as set forth in claim 15 wherein one end of the flexible transmitter is connected to the pivot point of the parallelogram linkage system opposite to the pivot point to which the nut is connected.

References Cited

UNITED STATES PATENTS

| | | | |
|---|---|---|---|
| 1,517,100 | 11/1924 | Bacon | 105—369 |
| 2,024,444 | 12/1935 | Friedlaender | 105—368 |
| 2,102,229 | 12/1937 | Tinnerman | 151—21 |
| 2,467,657 | 4/1949 | Brown | 254—126 |
| 2,529,289 | 11/1950 | Beckett | 105—369 |
| 2,952,289 | 9/1960 | Kreidel et al. | 151—21 |
| 2,969,023 | 1/1961 | Chapman et al. | 105—368 |
| 3,008,210 | 11/1961 | Stovern | 294—82 |
| 3,079,969 | 3/1963 | Buckley | 151—21 |
| 3,140,850 | 7/1964 | Packard | 105—368 |
| 3,200,772 | 8/1965 | Moorhead | 105—369 |

ARTHUR L. LA POINT, *Primary Examiner.*

DRAYTON E. HOFFMAN, *Examiner.*

UNITED STATES PATENT OFFICE
CERTIFICATE OF CORRECTION

Patent No. 3,333,553                 August 1, 1967

Raymond M. Krokos

It is hereby certified that error appears in the above numbered patent requiring correction and that the said Letters Patent should read as corrected below.

Column 6, line 25, for "2,529,289" read -- 2,529,588 --.

Signed and sealed this 14th day of November 1967.

(SEAL)

Attest:

Edward M. Fletcher, Jr.
Attesting Officer

EDWARD J. BRENNER
Commissioner of Patents